Jan. 4, 1966  H. C. EBERLINE  3,227,875
GAMMA DOSE RATE METER UTILIZING A SCINTILLATION DETECTOR
Filed May 4, 1961  2 Sheets-Sheet 1

INVENTOR
H.C. EBERLINE
BY
ATTORNEYS

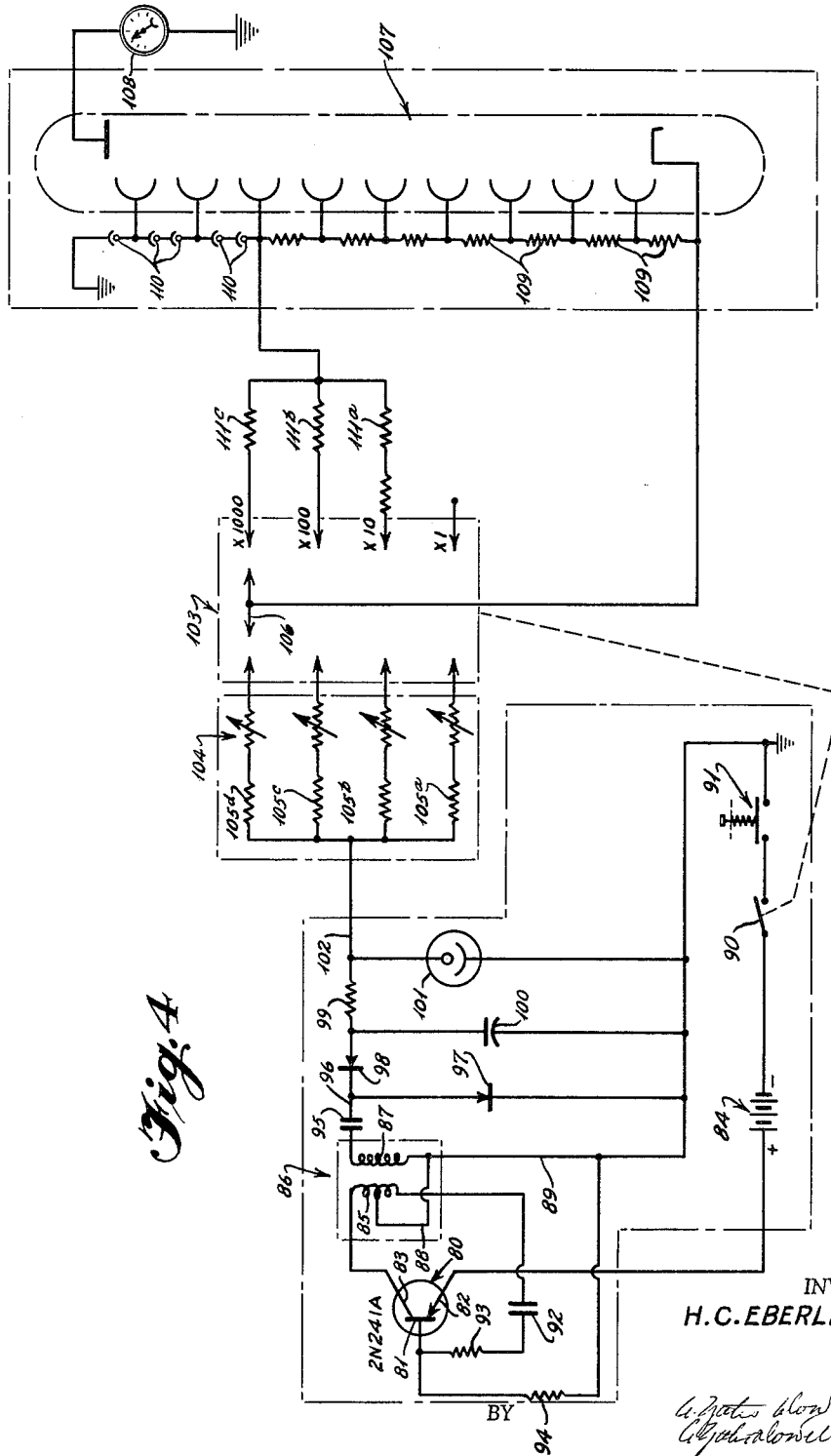

United States Patent Office 3,227,875
Patented Jan. 4, 1966

3,227,875
GAMMA DOSE RATE METER UTILIZING A SCINTILLATION DETECTOR
Howard C. Eberline, Santa Fe, N. Mex., assignor to Eberline Instrument Corporation, Santa Fe, N. Mex.
Filed May 4, 1961, Ser. No. 107,754
8 Claims. (Cl. 250—71.5)

This invention relates to nuclear energy and more particularly to the detection and monitoring of gamma radiation over a wide range of intensities.

Various sources of energy used in weapons and for other purposes emit gamma or other electromagnetic radiation. Such radiation in varying amounts may, as a result of an accident or tactical use of such devices, cover a large area of terrain, airport or other structure, or be present in the air, and in amounts which present a hazard to personnel or material exposed thereto. The intensity of radiation may vary from a low level at which prolonged human exposure appears to present no serious effect to high levels which are highly dangerous or fatal upon brief exposure.

It is, accordingly, desirable to be able to ascertain the level of radiation intensity within suspected areas or locations. Further, that quantative detection be possible over a wide range. If the detector is not sufficiently sensitive, then significant radiation may be overlooked. On the other hand, if the detector cannot distinguish between very high intensities, then personnel involved cannot determine how to escape from a danger area, nor estimate the length of time that they may expose themselves thereto.

A further desirable characteristic is that the detector be conveniently portable and useful for long periods of time with a minimum of attention or replacement of energy source, and with continued reliability and stability of response.

Accordingly, it is an object of the present invention to provide a gamma dose rate meter having the capabilities and qualities which reference has been made.

Figure 1:
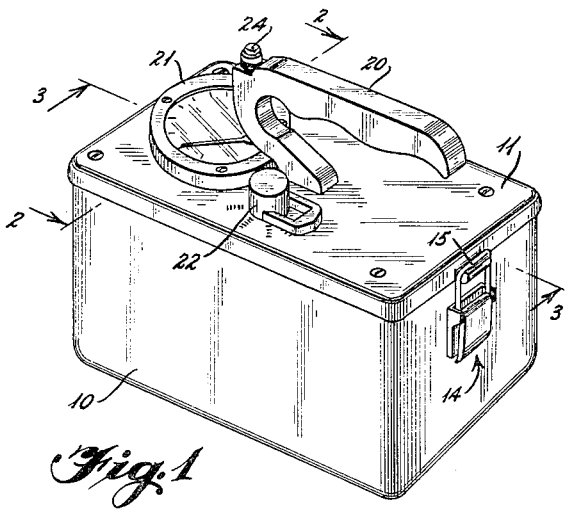
Figure 2:
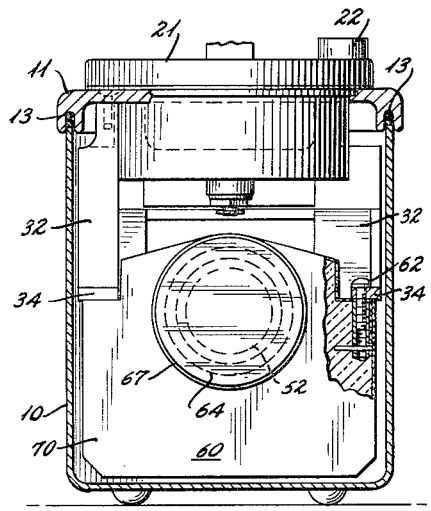
Figure 3:
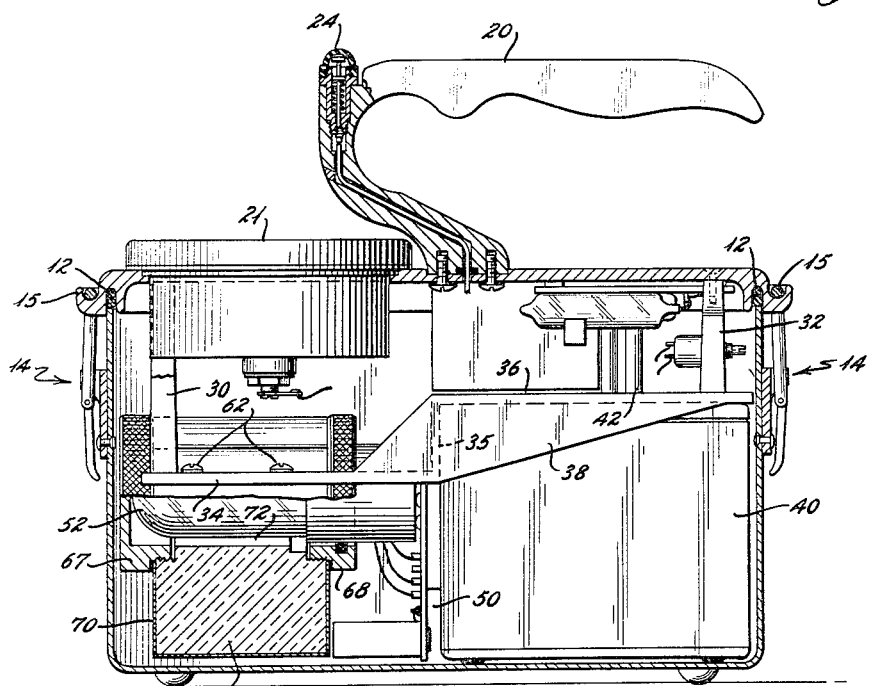

These and other objects of the invention will become apparent from the following description in conjunction with the accompanying drawings, in which:

FIG. 1 is a perspective of a device constructed in accordance with the present invention;

FIG. 2, a section on the line 2—2 of FIG. 1;

FIG. 3, a section on the line of FIG. 1, with fragmentary elevation of certain components, and FIG. 4, a circuit diagram of the device.

Briefly stated, the invention is embodied in an instrument including a scintillation crystal, a photomultiplier tube, an indicating meter, range selecting components and a source of direct current high voltage supplied by components including a light weight battery pack. When operated, the instrument gives a practically instantaneous reading, eliminating the necessity for leaving in "on" except when readings are actually taken, thereby only conserving battery life but eliminating the characteristic drift of the photomultiplier when the same is energized over a period of time. The photomultiplier voltage dropping circuitry is arranged to provide high accuracy and sensitivity over a wide range.

With further reference to the drawings, the invention is embodied in an instrument illustrated in FIGS. 1 to 4. The device includes a carrying case, preferably of aluminum, including a can 10 having a top cover 11. The rim of the can has a gasket 12 received within the channel 13 of the cover to provide a seal against liquids, gases and light. Toggle latches 14 are provided at each end of the can for engaging ears 15 on the cover to maintain snug relationship of the cover and can. On the cover there is a carrying handle 20, a microammeter 21 and a five-position switch 22. Mounted in the handle for convenient use is a depressible normally "off" push-button switch 24.

The elements which are mounted internally of the can and cover are mounted upon the cover whereby upon release of the latches 14 the can cover may be removed in order to expose the interior components for inspection. In order to mount such interior parts, a chassis or frame is provided comprising a pair of spaced relatively long struts 30 projecting downwardly from the meter end of the cover, a pair of spaced relatively short struts 32 projecting downwardly from the other end of the cover, spaced rail members 34 extending perpendicularly from the struts 30 and a raised plate 36 offset from the rails 34 by brackets 35 and connected to struts 32 and with strengthening ribs 38 at either side. Plate 36 supports housing 40 for the batteries. Mounted on the underside of the cover is a power supply card 42 whose components will be described.

At the side of the housing 40 a tube socket board 50 is mounted on the chassis and has connections for the photomultiplier tube 52 and the voltage dropping elements. The photomultiplier tube is received within a scintillation crystal 60 which is mounted on rails 34 by fasteners 62.

The scintillation crystal is known as a "Pilot Scintillator" and is a product of Pilot Chemicals, Inc., Watertown, Massachusetts. It is substantially rectangular with a cylindrical opening 64 near the upper portion for receiving the photomultiplier tube. A metal end cap 67 and an annular base cap 68 are provided for retaining the photomultiplier tube in light-tight engagement with the crystal 60. The crystal has a coating 70 which protects it against abrasion or moisture and may, if desired, be light-tight in order to prevent any light from entering or leaving the crystal and is highly reflective on its inner surface. Various substances such as titanium white paint may be used. Thus the scintillations produced within the crystal by the gamma radiation are reflected from the coating 70 and a portion enters the photomultipler tube 52 through the window 72. The crystal is of sufficient area and volume to accurately register a wide range of gamma radiation intensities.

The switch 22 mounted on the cover has five positions, one of which is off. The other four are for the selection of ranges corresponding to 1,000, 100, 10 and 1 roentgens per hour full scale meter reading.

When the switch is in any position except off, depression of the push button switch 24 will cause the appropriate circuit to be energized in order that radiation intensity may be indicated on the meter.

The circuitry including that for supplying potential to the photomultiplier tube and controlling the application of dynode voltages to vary the sensitivity of the tube is illustrated in FIG. 4.

Such circuitry includes a blocking oscillator comprising a transistor 80 having a base 81, emitter 82 and collector 83, the emitter being connected to the positive end of a stable 6 volt direct current supply such as mercury or standard "D" cells 84 or a rechargeable wet cell pack. The collector is connected to one end of a primary coil 85 of a transformer 86 whose secondary 87 has a high turn ratio to the primary. An intermediate portion of the primary coil is tapped and connected via lines 88 and 89 to ground. The opposite end of the battery is grounded via one deck 90 of a wafer switch illustrated in developed form, and a normally open push button switch 91.

The opposite end of primary coil 85 is connected via a capacitor 92 and limiting resistor 93 to the base of the transistor. The base is also connected via a limiting resistor 94, ground connections, push button switch 91 and switch deck 90 to the negative side of the battery.

As a result of the circuit described a variable voltage in the upper portion of coil 85 induces a voltage in the lower portion of the coil which via the capacitor 92 and resistor 93 imposes a blocking voltage on the transistor, whereby an oscillatory output is produced and picked up by the secondary coil 87 of the transformer. Upon closure of the push button switch, assuming that the deck switch 90 is closed, a stable oscillatory voltage is almost immediately available, the oscillator functioning within one and one half seconds. The oscillating voltage is stepped up by the transformer 86 and fed via a rectifier and smoothing circuit to the cathode of the photomultiplier. One end of the secondary is grounded by line 89. The other end of the secondary is connected to a voltage doubler including a capacitor 95, and line 96 to diodes 97 and 98. Resistor 99 and capacitor 100 provide for smoothing of the rectified voltage; a corona discharge voltage regulating tube 101 is shunted across the supply lines to steady the voltage at the output terminals of the power supply.

Thus there is provided in the instrument a current or voltage supply (selected to be of the order of 1240 volts) which is almost instantaneously available upon closure of a push button switch and which is finely filtered and regulated. Because of the use of the normally open push button 91, battery current is conserved and drifting in the photomultiplier tube due to continued use of the tube is obviated. With intermittent use of the photomultiplier, it has been found that no noticeable drift takes place.

The voltage applied to the photomultiplier tube can be modified to vary the latter's sensitivity by interposing interchangeable voltage dropping resistors of different magnitudes between output terminal 102 of the supply unit and the tube. This is effected by providing a second deck 103 on the wafer switch. The first deck has an off position and four operative circuit positions. The second deck likewise has an off position and four positions operative to vary the sensitivity of the tube from full value to one tenth, one hundredth and one thousandth of its sensitivity.

To accomplish this result, the terminal 102 is connected, in multiple, to four sets of series connected resistors, each set including a potentiometer as potentiometer 104 and a fixed resistor 105a–105d. These series connected sets of resistors and potentiometers are connected to different contacts of the second deck 103 and switch arm 106 will therefor selectively connect them to the cathode of the photomultiplier tube 52.

As an example, and not as a limitation of the invention, the photomultiplier tube may be a type RCA 1P21. The potentiometers may each be 5 megohms and the resistors 105a–105d connected in series therewith, for the maximum sensitivity to the lowest sensitivity, may be 3 megohms, 7 megohms, 10 megohms and 12 megohms, respectively; with this arrangement the drop across the tube may be varied by as much as 1000 volts.

For measuring the output from the photomultiplier tube, which is located within the crystal and which responds to scintillations therein, there is provided a sensitive microammeter 108 having full scale deflection at a low value, such as 20 microamperes.

Without compensatory circuitry, difficulties arise when a photomultiplier is operated at low voltages. Where the voltage across the tube is low, the output current is also low, and may not be sufficient for full scale deflection of the meter, or erroneous readings may result due to improper functioning of the tube and its dynode connected resistors.

To compensate for this characteristic and to attain proper voltage distribution, among the earlier dynodes resistors 109 of high values, such as 3 megohms, are used; the last few dynodes are bridged by gas filled tubes having constant voltage dropping characteristics, such as neon tubes 110, whose dropping voltages may be 55 volts.

The string of dynode resistors is shunted by different valued resistors, as the switch arm 106 is operated. With the highest sensitivity of the tube, there is no shunting resistor across the resistors 109, i.e., the shunting resistance can be considered as infinite.

As the switch arm moves progressively toward lower and lower tube sensitivity control, the shunting resistors indicated as 111a, 111b and 111c introduce decreasing resistance in order to increase the current flow through the meter to give full scale deflection at each of the ranges.

In the illustrated embodiment, the resistors 111a–111c have values of 40 megohms, 15 megohms and 10 megohms, respectively. Thus, as the switch arm 106 varies the input to the tube, it simultaneously functions to govern the deflection range of the microammeter.

Accordingly, it will be understood that the present invention includes a wide intensity range gamma detector for indicating the strength of such radiation. The instrument has a light weight selfcontained battery pack for supplying a regulated direct current voltage to a photomultiplier tube which is enclosed in a scintillating crystal, the latter illuminating in proportion to the intensity of the gamma field present. The tube has voltage dropping elements and compensatory circuitry to assure full scale meter deflection at low voltage levels, thereby assuring accuracy of response. Due to the substantially immediate reading available when the instrument is turned on, the necessity for depleting the battery during periods when readings are not actually being taken is obviated and the problem of photomultiplier drift accompanying sustained operation is substantially eliminated.

Hence, there is provided a light weight, high intensity range instrument which is simple and easy to operate and which consumes a minimum of energy, whereby battery life is greatly extended.

It will be obvious to those skilled in the art that various changes may be made in the embodiment of the invention described without departing from the spirit and scope thereof and, therefore, the invention is not limited to what is shown in the drawings and described in the specification, but only as set forth in the following claims.

What is claimed is:

1. A radiation detector comprising a housing, a handle attached to the housing, a switch biased to open position in the handle, a direct current steady power supply, a photomultiplier tube, a scintillation crystal encasing a substantial portion of said photomultiplier tube, voltage dropping elements, means for connecting said power supply to said photomultiplier tube through said switch and voltage dropping elements, and a meter directly connected to the output of the photomultiplier tube, said supply, tube, crystal, elements, connecting means and meter being mounted within said housing.

2. A radiation detector comprising a housing, a direct current steady power supply, a photomultiplier tube, a scintillation crystal encasing a substantial portion of said photomultiplier tube, voltage dropping elements, means for connecting said power supply to said photomultiplier tube through said voltage dropping elements, and a meter directly connected to the output of the photomultiplier tube, said supply, tube, crystal, elements, connecting means and meter being mounted within said housing, said scintillation crystal comprising a relatively large substantially rectangular block having a bore near one side for receiving said tube, said tube having a window opening towards the opposite side of said block, said block having a reflective coating on its exposed exterior.

3. The invention of claim 2, said housing including a cover, a chassis mounted on said cover within said housing, said crystal and said power supply being mounted on said chassis in side-by-side relation and extending adjacent to the floor of said housing, whereby said crystal is exposed to radiation which passes through the bottom and sides of said housing and said power supply is readily accessible upon the removal of said cover from said housing.

4. In a scintillator, a photomultiplier tube in position to receive light, a self contained power supply for the photomultiplier tube, a meter directly connected to the output of the tube, a set of variable magnitude resistors selectively interposed between the power supply and the tube, switch means for coupling in a selective variable magnitude resistor, and said photomultiplier tube having dynodes with resistors shunting a number of the dynodes, the remaining dynodes being shunted by voltage dropping devices of constant potential thereacross, and additional shunting resistors, with means to selectively shunt any of said additional shunting resistors across the dynode shunting resistors.

5. In a scintillator, a photomultiplier tube in position to receive light, a self contained power supply for the photomultiplier tube, a meter directly connected to the output of the tube, a set of variable magnitude resistors selectively interposed in series between the power supply and the tube, switch means for coupling in a selective variable magnitude resistor, and said photomultiplier tube having dynodes with resistors shunting a number of the dynodes, the remaining dynodes being shunted by voltage dropping devices of constant potential thereacross, and additional shunting resistors, with means to selectively shunt any of said additional shunting resistors across all of the dynode shunting resistors.

6. In a scintillator, a photomultiplier tube in position to receive light, a self contained power supply for the photomultiplier tube, a meter directly connected to the output of the tube, a normally open switch between the power supply and tube, a set of variable magnitude resistors selectively interposed between the power supply and the tube, switch means for coupling in a selective variable magnitude resistor, and said photomultiplier tube having dynodes with resistors shunting a number of the dynodes, the remaining dynodes being shunted by voltage dropping devices of constant potential thereacross, and additional shunting resistors, with means to selectively shunt any of said additional shunting resistors across the dynode shunting resistors.

7. In a scintillator, a photomultiplier tube in position to receive light, a self contained power supply for the photomultiplier tube, a meter directly connected to the output of the tube, a normally open switch between the power supply and tube, a set of variable magnitude resistors selectively interposed between the power supply and the tube, switch means for coupling in a selective variable magnitude resistor, said photomultiplier tube having dynodes, resistors shunting a number of the dynodes, voltage dropping devices of constant potential shunting the remaining dynodes, additional shunting resistors, and means to selectively shunt any of said additional shunting resistors across the dynode shunting resistors, said last means being coupled to the switch means for synchronous operation therewith.

8. A radiation detector comprising a housing including a cover with a handle thereon, the underside of said cover supporting a scintillation crystal in the form of a block with a bore extending therethrough, a photomultiplier tube envelope embedded substantially wholly within the bore of said crystal, a direct source of steady power supply, an oscillator, transformer, resistors and switching means, a meter mounted in the cover, all said parts carried by the cover being electrically interconnected to cause radiations from the crystal to be indicated on the meter, said switching means including a switch controlling the opening and closing of the circuit to the battery, said switch being spring biased to open position and mounted within the handle in position to be operated to closed condition by the finger of an operator grasping the handle.

References Cited by the Examiner
UNITED STATES PATENTS

| | | | |
|---|---|---|---|
| 2,700,108 | 1/1955 | Shamos | 250—71.5 |
| 2,735,947 | 2/1956 | Molloy | 250—83.6 |
| 2,750,514 | 6/1956 | Armistead | 250—71.5 |
| 2,759,107 | 8/1956 | Armistead et al. | 250—71.5 |
| 2,833,931 | 5/1958 | Constable | 250—83.6 |
| 2,846,591 | 8/1958 | Valeton | 250—207 |
| 3,097,310 | 7/1963 | Sharp et al. | 250—71.5 X |

OTHER REFERENCES

A Portable Scintillation Counter, by I. G. Snyder, from Radio and Television News, April 1955, pp. 35 to 38.

Transistorized Portable Counting-Rate Meter, by Goldsworthy, W. W., from Nucleonics, vol. 18, No. 1, January 1960, pp. 92, 94, 96, 98, 99.

RALPH G. NILSON, *Primary Examiner.*

ARTHUR GAUSS, ARCHIE R. BORCHELT,
*Examiners.*